June 30, 1970 M. STORTI 3,518,152
APPARATUS FOR PRODUCING FABRIC-FILM LAMINATES
Filed Oct. 22, 1965 2 Sheets-Sheet 1

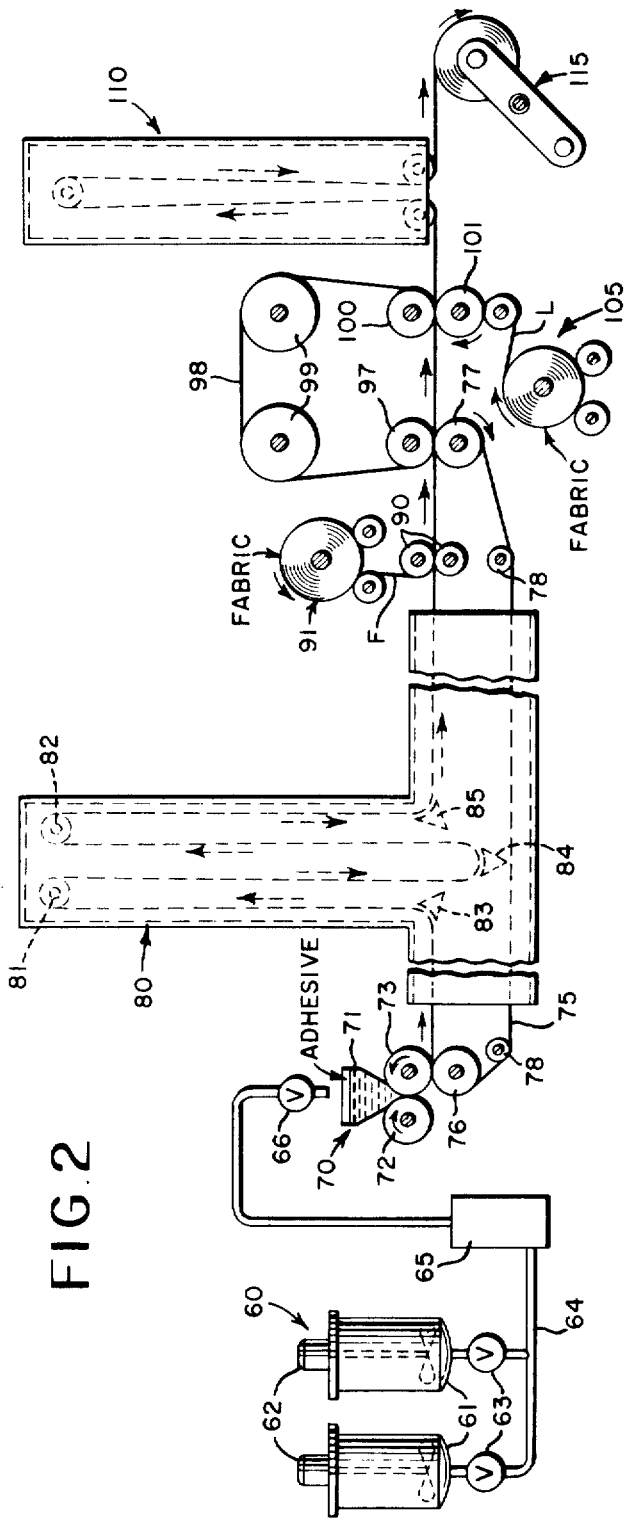

United States Patent Office 3,518,152
Patented June 30, 1970

3,518,152
APPARATUS FOR PRODUCING FABRIC-FILM LAMINATES
Michael Storti, Barrington, R.I., assignor to Rohm & Haas Company, Philadelphia, Pa., a corporation of Delaware
Filed Oct. 22, 1965, Ser. No. 500,904
Int. Cl. B32b 31/08
U.S. Cl. 156—540                                2 Claims

ABSTRACT OF THE DISCLOSURE

Apparatus for forming composite laminates including a fabric substrate and an adhesive film wherein a continuous film of adhesive composition is formed, dried to a tacky but uncured state, thereupon laminated to a fabric substrate web, and thereafter wound up as a preliminary laminate product for subsequent laminating with other materials or for forming by a molding or embossing process coupled with permanent curing. Alternatively, before being wound up, the preliminary laminate may be immediately laminated with a fabric layer or other material layer to provide a three component laminate or immediately formed by molding or embossing and finally permanently cured.

---

The apparatus of the instant invention is particularly suitable for production of fabric-film laminates that have been recently developed as useful in a wide variety of applications such as in automobile upholstery and head liners, furniture, foundation garments, quilts, sportswear, etc. These laminates and methods for their fabrication and utilization in various novel articles are set forth in U.S. patent applications Ser. Nos. 389,999 now Pat. No. 3,249,984, and 390,059, now abandoned, and 390,064, now Pat. No. 3,327,707, filed by M. Storti; and Ser. No. 390,669, now Pat. No. 3,471,354, filed by G. Scofield.

Many of the applications for fabric-film laminates contemplate a molding or embossing operation wherein a three-dimensional configuration or pattern is imparted to the laminate in its final permanently cured form. This, of course, requires complete and tenacious adherence of the adhesive film to the fabric in the final laminate. Another severe demand on the quality of the laminate occurs where the fabric is constructed of so-called stretch yarn and the final product is continually subjected to stretching and releasing under conditions of use. In addition to these demands for the laminate, the fabric-film laminate in many cases must meet stringent requirements of whiteness, softness and the general combination of properties referred to in the fabric art as "hand." Finally, the fabric-film laminate must be capable of being easily cleaned, preferably either by dry-cleaning or normal wet-washing procedures.

It is a principal object of the present invention to provide an apparatus wherein a continuous uniformly thin film of adhesive composition is formed and effectively laminated with a fabric substrate to be subsequently subjected to molding, embossing or other laminating operations wherein the film is finally cured to a permanent state.

It is a further object of the instant invention to provide effective and simplified apparatus for producing a continuous fabric-film laminate having improved tenacity of adherence between the film and fabric.

Generally, the apparatus of the instant invention for producing a composite laminate which includes a fabric substrate and adhesive film, comprises mixing a thermosetting adhesive composition, providing an applicator with driven mating rolls to form therebetween a film of the adhesive composition which film is cast on to an adhesive conveying surface, the conveying surface then passing through a drying chamber followed by a pair of fabric application rolls associated with a fabric supply roll holder which feeds a fabric substrate between the fabric application rolls and on to the tacky film of adhesive composition. These rolls are followed by a pair of press rolls which firmly laminate the fabric substrate and adhesive film together. The conveying surface is then drawn away from the fabric-film laminate and winding means is provided to wind up the laminate product.

The term "abhesive" is used herein to define the characteristic of the conveying surface on which the adhesive composition film is cast. This "abhesive" characteristic facilitates the fabric-film laminate to be drawn away from the conveying surface, the prefix "ab" of the term having its recognized meaning of signifying "away from."

The above and other objects of the instant invention will become more readily apparent by reference to the accompanying drawings in which two embodiments are disclosed by way of example, various modifications and changes of details thereof being contemplated within the scope of the appended claims.

The apparatus of the invention is illustrated in the accompanying drawings in which:

FIG. 2 is a diagrammatic view similar to FIG. 1 but showing a simplified preferred apparatus in accordance with the invention.

FIG. 2a is a sectional view showing the conveyor belt carrying a film of adhesive composition cast thereon.

FIG. 2b is a sectional view showing the conveyor belt carrying the composite of a fabric and adhesive composition film.

FIG. 2c is a sectional view showing a three component laminate consisting of the adhesive composition film and two fabric layers.

Figure 1:
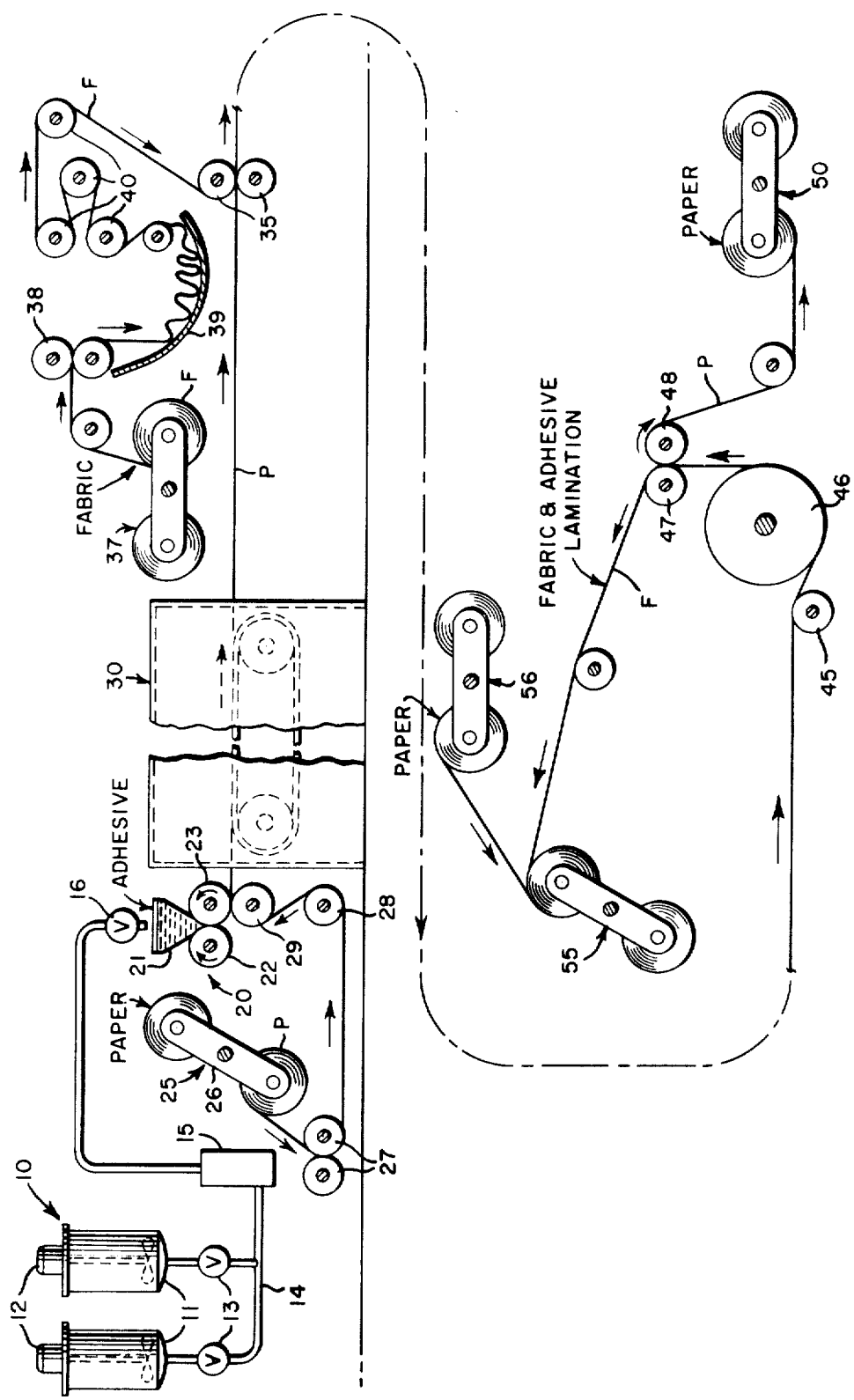
FIG. 1 is a diagrammatic view showing the components of the apparatus of the invention

The apparatus of FIG. 1 will first be described, with reference to the components thereof and their functions in producing a fabric-film laminate.

In the upper left corner of FIG. 1, a mixing unit 10 is shown. This unit is made up of a pair of mix tanks 11, each preferably having a cooling jacket, (not shown) and a motor-driven agitator 12. The two tanks are preferably used alternately for mixing and feeding of the adhesive composition, the feeding from each tank being done by introducing air under pressure above the batch of adhesive composition therein. Valves 13 in feed line 14 from the two tanks 11 may be appropriately operated to change feed from one tank to the other while a new batch of adhesive is being mixed in the first tank. Feed line 14 extends through a strainer 15 which may appropriately employ 100 mesh cloth to supply the adhesive composition in a filtered condition. A valve 16 controls final supply of the adhesive composition to the reservoir of an adhesive applicator 20.

The thermosetting adhesive composition prepared in the mixing unit 10 and supplied to applicator 20 may take a variety of forms. The particular makeup of the composition forms no part of the invention herein. Suitable adhesive compositions are set forth in U.S. Pat. 3,033,811 of Brown, et al., 3,575,672 of Kline et al. and U.S. application Ser. No. 473,198, now abandoned, filed by James P. Shelley.

The applicator 20 has a container 21 to retain a supply of the adhesive composition. The container 21 as associated with a pair of mating rolls 22 and 23 which are driven by suitable means (not shown) to withdraw material from container 21 and form between the rolls a film of the adhesive composition. A uniformly thin film of between 0.002" and 0.005" is preferred.

The film of adhesive composition passes from roll 23 onto a conveying surface. As will be described, this conveying surface is formed by a length of abhesive material such that the film may be dried on the conveying surface and otherwise handled and thereafter be removed from such surface incident the laminating process.

In the embodiment shown in FIG. 1, a release paper feed 25 is mounted adjacent the applicator 20. This paper feed includes a holder 26 of the automatic turret type which, as shown, holds two rolls of paper P, one roll being connected to supply the conveying surface for receiving the film from the applicator and the other roll being available in readiness upon exhaustion of paper from the first roll. This turret type web feeding unit is well known as used in various web feeding applications such as in the printing arts and its description in detail should not be necessary herein. To render the paper abhesive to the film of adhesive composition which is cast thereon, a paper coated with polyethylene or silicone may be employed. A suitable coated paper for the embodiment of FIG. 1 may be a polyethylene coated kraft paper.

The web of paper P is fed from the release paper feed 25 to the nip of a pair of rollers 27, beneath an idler roller 28 and over a roller 29 which is disposed immediately beneath the roller 23 of applicator 20. At this point the film of adhesive composition is cast on to the upper surface of the release paper by being transferred from applicator roll 23 to the release paper.

The release paper forming an abhesive conveying surface thereafter passes through a drying chamber 30 within which it may be suitably supported by a belt assembly shown in dotted lines on FIG. 1. The drying chamber 30 is provided with appropriate blowers, heaters, controls, etc., as are well known, to provide the desired flow of drying atmosphere within the chamber to dry the film of adhesive composition cast onto the conveying surface. When the release paper conveying surface leaves the dryer the film is preferably dried to a tacky state but the temperature to which the film has been exposed will not have been sufficiently high to have finally or permanently cured the film.

In this state the film is in condition to be laminated with a fabric or other substrate as is characteristic of the films usable herein as have been identified hereinabove. In this uncured state the film at ordinary room temperature will have essentially no tackiness but by raising the temperature of the film to about 140° to 200° F. for a limited period of time the film will again become tacky and be in a condition for lamination with a fabric or other material. This tackifying temperature may be maintained for an hour or more if need be without permanent curing. However, when it is desired to completely cure the film and obtain a permanent set where embossing or molding is involved or a permanent bond between the materials contacting the opposed faces of the film, curing temperatures in the order of 210° to 500° F. for periods of about one-half hour at the lower temperature to as low as one second at the higher temperature will be employed.

The release paper P forming the conveying surface and with the film of adhesive composition in a dry but tacky uncured state passes from drying chamber 30 between a pair of fabric application rolls 35. A fabric supply roll holder 37 is mounted above the conveying surface. As illustrated, a two-station unwinding turret type unit carrying two rolls of fabric F is provided, this being comparable to the unwinding unit 25 provided for the release paper P.

Fabric F from the one roll of fabric currently in use as shown in FIG. 1 is fed between rollers 38 into a J box 39 where tension that may have existed in the wound fabric strip is relieved as the fabric assumes a loosely draped state within the J box. The fabric is withdrawn from the J box passing over various rollers 40, the drive for which is appropriately controlled to provide uniform tensioning of the fabric as it is fed to the fabric application rolls 35. The use of a J box and automatic tensioning controls is only necessary where the fabric being laminated is of a stretch type material. With such a fabric tensioning and straightening of the fabric web is of importance. Where the fabric is of a non-stretch type it may be fed directly from roll holder 37 to the fabric application roll 35.

The fabric F passes into the nip of the driven fabric application rolls and onto the tacky film carried on the conveying surface of release paper P.

The composite of the fabric F and adhesive composition film passes from the fabric application rolls over a web guide 45 and then around a preheating drum 46. This drum may be in the order of 36" in diameter and have a thermostatically controlled temperature of 180° F. maintained by hot water circulation. The drum is positioned to be engaged by the fabric side of the film-fabric composite acting to heat up the fabric for the final laminating produced when the fabric-film composite passes between press rolls 47 and 48. Roll 47 may be a 14" diameter steel roll heated to 180° F. Roll 48 may suitably be a 12" diameter rubber roll that is driven to draw the laminate between the bite of rolls 47 and 48.

Upon leaving the press rolls 47 and 48 the conveying surface formed by the release paper P is drawn away from the fabric-film laminate by a release paper rewind unit 50. This unit may be of the two-station turret type to wind up one roll of paper while another full roll is being removed and a new winding spindle substituted to ready the unit for continuous wind up on the new spindle.

The fabric-film laminate separated from release paper P is wound up on an automatic two-station turret type winder 55 similar in construction to the winding unit 50. Although at this stage the adhesive film may be cooled to be essentially nontacky, to guard against any remaining tackiness and also to protect the film for its subsequent ultimate use, an interleaving paper supplied from a two-roll turret type unwinding unit 56 is wound up with the laminate product on the roll being wound on winder 55.

In the embodiment of FIG. 1 the preliminary laminate product made up of the adhesive film and one fabric substrate is wound up. In this state the film is not finally cured but at ordinary room temperature remains in an essentially nontacky state in which condition it can be stored or shipped pending final use of the product in an embossing or molding operation, or in a laminating operation carried out with another fabric layer or other material to be combined into a three component laminate. The fabric-film laminate need merely be unwound from the roll formed in the apparatus of FIG. 1 at winding unit 55 and heated up to tackifying temperature of about 140° to 200° F. to tackify the adhesive film. The second fabric layer or other material layer is then laminated to the tacky film and then the three component laminate passed through a curing oven having a temperature of about 210° to 500° F. for an appropriate time period to finally cure the adhesive film and form a final permanent bond between the film and the two layers of material on opposite sides of the film.

Alternative to winding up the preliminary product with an interleaving paper such as shown in the apparatus of FIG. 1, the fabric-film laminate may be immediately laminated to another layer of fabric or other material or may be subjected to immediate molding or embossing. In either case, thereafter final curing of the film to produce the end product would be carried out. This approach is shown and will be described hereinafter with reference to the preferred simplified apparatus embodiment of FIG. 2.

Winding up the intermediate product of a fabric-film laminate with interleaving paper has the advantage in that this preliminary product can then be sold to different customers and each customer can thereupon finally laminate, mold, or emboss to achieve the final product desired for that particular customer. For example, piece goods can be made up with one fabric substrate or even with two layers of fabric or other materials but with the film still uncured. These piece goods can be sold in bulk and the manufacturer undertake the desired molding or embossing to obtain the end product that he desires.

FIG. 2 illustrates a simplified preferred embodiment of the apparatus. The mixing unit and applicator shown in FIG. 2 are identical to the corresponding components of the apparatus of FIG. 1. Thus, there is a mixing unit 60 including a pair of mixing tanks 61 each having a motor driven agitator 62, feed control valves 63 in line 64 leading through a strainer 65 to a final control valve 66. The applicator 70 has a container 71 to retain a supply of adhesive composition which feeds to a pair of mating rolls 72 and 73 which are driven to form therebetween a film of the adhesive composition.

The film of adhesive composition is cast from roll 73 on to an endless conveyer belt 75. This belt passes over head and tail bend pulleys 76 and 77 with the return run guided over idlers 78. The endless conveyer belt 75 provides an abhesive conveying surface which is associated with the adhesive applicator 70 to have the film of adhesive composition cast thereon. To provide the desired abhesive conveying surface the belt may be suitably coated with Teflon (a trademark for polytetrafluoroethylene) or may be formed from chrome-plated or stainless steel.

The upper run of conveyer belt 75 passes into a drying chamber 80. To provide adequate exposure to drying atmospheric conditions within chamber 80 without unduly increasing the length of the drying chamber, the belt 75 is conducted through a series of vertical paths extending up and over idlers 81 and 82. Since the film of adhesive composition is carried along through drying chamber 80 on the upper surface of conveyer belt 75 this upper surface cannot be contacted by idlers. Accordingly vacuum hold-down units 83, 84 and 85 are provided within the chamber 80 to guide the lower ends of the paths of movement of belt 75 beneath the idlers 80 and 81. Appropriate controls, blowers, heaters, etc. (not shown), all as are well-known in the art, are provided to offer the desired air temperature and humidity conditions within drying chamber 80.

Upon leaving the drying chamber 80 the conveyer belt 75 with the tacky essentially dried but uncured film carried thereon passes between a pair of fabric application rolls 90. A fabric supply roll holder 91 is mounted above conveyer belt 75 and fabric F is supplied from a roll of fabric on such holder to the bite of fabric application rolls 90.

The fabric roll holder 91 feeds the fabric directly to the fabric application rolls 90 and thus is not provided with the fabric tension relieving J box such as discussed in the embodiment of FIG. 1. It will, of course, be understood that if stretch types of fabrics are being fed from holder 91 an appropriate tension relieving J box can be provided intermediate the holder and the fabric application rolls 90.

The composite of the fabric and adhesive film still carried on the abhesive conveying surface of belt 75 passes immediately from fabric application rolls 90 to press rolls provided by bend pulley 77 for the conveyer belt 75 and a roller 97. A tension control belt 98 is threaded over pulleys 99, roller 97 and between a pair of laminating rolls 100 and 101.

Upon leaving the press rolls, belt 75 is drawn away from the adhesive film and fabric laminate through the return run of the endless conveyer belt to the head bend pulley 76. The fabric with the adhesive film laminated thereto moves along with tension control belt 98 into the bite of laminating rolls 100 and 101. A second fabric supply roll holder 105 is provided beneath the tension control belt 98 to feed from a fabric roll supported on such holder a fabric layer L to the bite of laminating rolls 100 and 101. Preferably the roller 101 will be heated to a tackifying temperature of about 180° F. to preheat the fabric and also insure proper tackiness for the adhesive film underlying the fabric substrate F.

A three component laminate made up of the adhesive film sandwiched between two layers of fabric leaves laminating rolls 100 and 101, the film still being in an uncured state. Thereupon the laminate is conducted into a curing oven 110 wherein the three component laminate is subjected to appropriate heating for a proper length of time to finally and permanently cure the adhesive film such that the two fabric layers are finally permanently bonded together. As previously referred to, the oven temperature may be from about 210° to 500° F. depending upon the time period for exposing the laminate to curing temperature in the oven to permanently cure the film.

Upon leaving curing oven 110 the three component final laminate product is wound up on a suitable winder, a two-station turret type winder being shown generally similar to the winders shown and described with reference to the embodiment of FIG. 1.

On FIG. 2 the three encircled sectional views, FIGS. 2a, 2b and 2c, depict the state of the laminating process at the point along the apparatus components identified by the arrow which leads to each encircled view. Thus, in the left encircled view conveyer belt 75 is carrying only the film of adhesive composition which has been cast thereon. In the middle encircled view the conveyer belt carries the composite of the fabric F and adhesive composition film. In the right encircled view the conveyer belt 75 has been drawn away from the film and the second fabric layer L applied to the underside of the film such that a three component laminate is passing into the curing oven 110.

Although in FIG. 2 the final product is disclosed as a laminate including two fabric layers it will be appreciated that as in the approach discussed with reference to FIG. 1, the composite fabric-film laminate leaving press rollers formed by bend pulley 77 and roller 97 may at that stage be wound up, preferably with an interleaving paper to protect the exposed adhesive composition film. This preliminary product can be stored and shipped as desired to the final user where the preliminary product can be laminated to another fabric or to other appropriate materials, or molding or embossing carried out as desired for the end use. Also the three component laminate of the two fabric layers with the adhesive film therebetween may be wound up immediately after leaving laminating rolls 100 and 101 with the adhesive film still uncured. This intermediate product may then be stored and shipped as desired to a final user who can carry out embossing or molding of the product under appropriate heat and pressure to give the desired three-dimensional configuration for the final product.

As a further alternative the apparatus of either FIG. 1 or FIG. 2 may be directly associated with an embossing molding operation to form and cure the final product immediately as it is formed. Such embossing or molding can be carried out in accordance with the teachings of one of the hereinabove identified Michael Storti and Gerald A. Scofield patent applications.

It is to be understood that the forms of invention herein shown and described are to be taken only as preferred embodiments of the invention and that various changes and modifications in the arrangement of the components, units, etc., may be resorted to without departing from the spirit or scope of the appended claims.

I claim:
1. Apparatus for producing a composite laminate including a fabric substrate and adhesive film comprising:
 a mixing unit for preparing a thermosetting adhesive composition and having means for feeding the adhesive composition therefrom,
 an adhesive applicator connected to receive the adhesive composition from said mixing unit, said applicator having driven mating rolls rotatable to form therebetween a film of the adhesive composition,
 said mixing unit including a pair of mix tanks connected to alternatively mix and feed the adhesive composition to said applicator,
 filter means connected in the feed line between said mixing unit and said applicator,
 conveyor means associated with said adhesive applicator providing an abhesive conveying surface onto which the film of adhesive composition is cast,
 a drying chamber enclosing a portion of the length of said conveying surface within which the film is dried to a tacky but uncured state,
 a pair of fabric application rolls between which said conveying surface passes as it extends from said drying chamber,
 a fabric supply roll holder mounted above said conveying surface driven to feed a fabric substrate from a roll of fabric supported on said holder between said fabric application rolls and onto the tacky film of adhesive composition carried on said conveying surface,
 means for separating the fabric substrate with the adhesive film laminated thereto from said conveying surface,
 and winding means for winding up the laminate product.
2. Apparatus for producing a composite laminate including a fabric substrate and adhesive film comprising:
 a mixing unit for preparing a thermosetting adhesive composition and having means for feeding the adhesive composition therefrom,
 an adhesive applicator connected to receive the adhesive composition from said mixing unit, said applicator having driven mating rolls rotatable to form therebetween a film of the adhesive composition,
 conveyor means associated with said adhesive applicator providing an abhesive conveying surface onto which the film of adhesive composition is cast,
 a drying chamber enclosing a portion of the length of said conveying surface within which the film is dried to a tacky but uncured state,
 said drying chamber having conveyor support means including vacuum holding means for guiding said conveying surface through a series of vertical paths to increase the length of exposure of the adhesive film to drying action,
 a pair of fabric application rolls between which said conveying surface passes as it extends from said drying chamber,
 a fabric supply roll holder mounted above said conveying surface driven to feed a fabric substrate from a roll of fabric supported on said holder between said fabric application rolls and onto the tacky film of adhesive composition carried on said conveying surface,
 means for separating the fabric substrate with the adhesive film laminated thereto from said conveying surface,
 and winding means for winding up the laminate product.

References Cited
UNITED STATES PATENTS

| | | | |
|---|---|---|---|
| 2,054,115 | 9/1936 | Abrams et al. | |
| 2,070,600 | 2/1937 | Jenett | 156—322 XR |
| 2,213,899 | 9/1940 | Brown et al. | 156—309 XR |
| 2,489,985 | 11/1949 | Speight | 156—249 XR |
| 2,559,649 | 7/1951 | Little et al. | |
| 2,739,919 | 3/1956 | Artzt | 156—232 |
| 2,813,052 | 11/1957 | Lancaster. | |
| 3,060,995 | 10/1962 | Lembo | 156—549 XR |
| 3,236,714 | 2/1966 | Traut | 156—323 XR |
| 3,330,713 | 7/1967 | Watson et al. | 156—298 XR |

ROBERT F. BURNETT, Primary Examiner

W. A. POWELL, Assistant Examiner

U.S. Cl. X.R.

156—231, 241, 249, 289, 543